United States Patent [19]

Brandt et al.

[11] 4,238,322

[45] * Dec. 9, 1980

[54] APPARATUS FOR PREPARATION OF A SPRAYABLE PRECIPITATED SILICIC ACID SUSPENSION

[75] Inventors: Bernd Brandt, Wesseling-Berzdorf; Peter Nauroth, Wesseling; Albert Peters, Erftstadt-Liblar; Helmut Reinhardt, Rodenkirchen, all of Fed. Rep. of Germany

[73] Assignee: Deutsche Gold- und Silber-Scheideanstalt vormals Roessler, Frankfurt am Main, Fed. Rep. of Germany

[*] Notice: The portion of the term of this patent subsequent to Jun. 13, 1995, has been disclaimed.

[21] Appl. No.: 870,544

[22] Filed: Jan. 18, 1978

Related U.S. Application Data

[63] Continuation of Ser. No. 648,848, Jan. 13, 1976, Pat. No. 4,094,771.

[51] Int. Cl.³ ............................................. B03B 1/00
[52] U.S. Cl. ............................................. 209/3; 209/1; 210/298; 423/335; 422/271
[58] Field of Search .................. 209/1, 2, 5, 3, 4, 268, 209/69; 210/298, 104; 423/339, 335; 366/156, 132; 422/269, 261, 267, 271; 23/267 R, 267 A, 267 B, 267 C, 267 F

[56] References Cited

U.S. PATENT DOCUMENTS

| 189,541 | 4/1877 | Andrew | 210/298 X |
|---|---|---|---|
| 968,077 | 8/1910 | Ray | 210/298 X |
| 1,739,305 | 12/1929 | Hilditch | 423/335 |
| 1,939,178 | 12/1933 | Luthy | 210/69 |
| 1,956,420 | 4/1934 | Gleason | 210/298 X |
| 2,396,336 | 3/1946 | Moore | 210/298 X |
| 2,663,553 | 12/1953 | Booth | 422/269 |
| 3,051,454 | 8/1962 | Goos | 366/156 |
| 3,172,727 | 3/1965 | Burke | 423/339 X |
| 3,256,068 | 6/1966 | Burke | 423/339 X |
| 3,308,991 | 3/1967 | Glassey | 222/57 |
| 3,326,815 | 6/1967 | Werner | 366/155 X |
| 3,372,046 | 3/1968 | Burke | 423/339 X |
| 3,563,382 | 2/1971 | Regent | 210/104 X |
| 3,647,397 | 3/1972 | Coleman | 422/261 X |
| 3,887,693 | 6/1975 | Nevado | 423/339 X |
| 3,915,225 | 10/1975 | Swonk | 210/104 X |
| 3,957,253 | 5/1976 | Barton | 366/132 |
| 4,014,655 | 3/1977 | Brunnberg | 366/156 X |

FOREIGN PATENT DOCUMENTS

| 580279 | 7/1959 | Canada | 423/335 |
|---|---|---|---|
| 2401207 | 7/1975 | Fed. Rep. of Germany | 423/335 |
| 1215038 | 11/1959 | France . | |

OTHER PUBLICATIONS

Fund. of Chem. Eng. Operations, Larian, Prentice Hall, Inc., 1958, p. 468.
Chem. Eng. Practice, Cremer et al., 1965, p. 292.

Primary Examiner—Robert Halper
Attorney, Agent, or Firm—Beveridge, DeGrandi, Kline & Lunsford

[57] ABSTRACT

A silicic acid filter cake and suspension agent are fed to a container equipped with a stirrer having a peripheral speed of about 20-30 m/sec. The ratio of container diameter to stirrer diameter is about 3:1. The ratio of container diameter to level of filling is a maximum of about 1:2. The container contains at least about 1.5 to about 2 kg of silicic acid suspension, for each 1 kg of silicic acid filter cake which is added to the container. The contents of the container is mixed while maintaining a pH of at most about 4. A portion of the resulting silicic acid suspension is drawn off from the zone of highest turbulence in the container. An apparatus for carrying out the process is provided.

3 Claims, 1 Drawing Figure.

U.S. Patent
Dec. 9, 1980
4,238,322
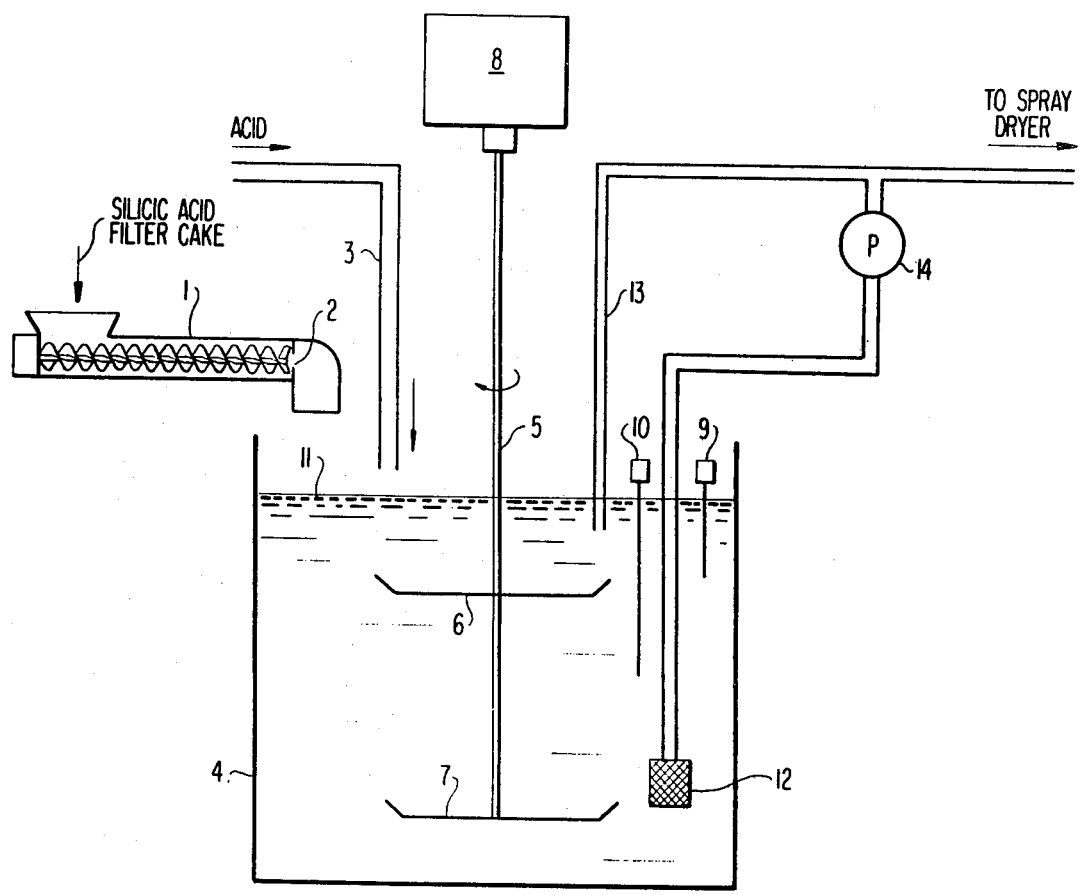

APPARATUS FOR PREPARATION OF A SPRAYABLE PRECIPITATED SILICIC ACID SUSPENSION

This is a continuation of application Ser. No. 648,848, filed Jan. 13, 1976, now U.S. Pat. No. 4,094,771 issued June 13, 1978, which is relied on herein.

This invention relates to an apparatus and process for the production of a sprayable, highly concentrated precipitated silicic acid suspension having little grit, and a solids content of at least about 12% by weight, preferably more than about 18% by weight.

Precipitated silicic acid, which is produced in a manner known per se by the wet-chemical method, must be dried in order to fulfill its purpose in normal use. This can be accomplished by feeding a filter cake to a spray-dryer or other drying means. Depending upon the solids content and structure of the silicic acid filter cake, the nozzle or the blower element can become clogged; clogging is more of a problem at higher solids content. Therefore, it is necessary to structure the silicic acid filter cake such that no clogging of the nozzle or of the blower element of the spray dryer will occur.

It has been known to dilute the filter cake with water in order to adapt the structure of the silicic acid filter cake to the requirements of the spray dryer. When the filter cake is diluted with water, however, a great deal of power must be used during drying in order to remove the added volume of water from the silicic acid filter cake. This method of processing of the silicic acid filter cake yields a filter dough having inhomogeneous structure. That is, the filter dough contains grit, i.e., it has particles of a size of over 45 $\mu$m.

Accordingly, there exists a need in the art for an apparatus and process that will structure a silicic acid filter cake so as to require a small expenditure of evaporation energy during spray drying while providing a substantially homogeneous silicic acid product substantially free of grit.

Accordingly, this invention provides a process for the production of a sprayable, highly concentrated aqueous suspension of precipitated silicic acid having little grit and at least about 12% by weight, preferably at least 18% by weight, solids. The process of this invention comprises continuously feeding a silicic acid filter cake and a suspension agent by way of feeding elements into a dissolver container provided with a stirring element. The ratio of the container diameter to the diameter of the stirring element amounts to about 3:1. The ratio of the dissolver container diameter to the level of filling amounts to a maximum of about 1:2. The dissolver container contains at least about 1.5 to about 2 kg of silicic acid suspension for each 1 kg of silicic acid filter cake which is added to the container. The silicic acid filter cake and suspension agent are mixed while maintaining a pH value of a maximum of about 4. The stirring element has a peripheral speed of about 20–30 m/sec. A portion of the resulting silicic acid suspension is drawn off from the zone of highest turbulence by way of a separating organ or a mixer.

This invention also provides an apparatus for the production of a sprayable, highly concentrated, suspension of a precipitated silicic acid having little grit and at least about 12% by weight solids. The apparatus comprises:

(a) a container having a diameter, said container provided with rotatable stirring means having a diameter and a peripheral speed of about 20–30 m/sec;
(b) means for feeding a silicic acid filter cake to the container;
(c) means for feeding a suspension agent to the container;
(d) means for removing a portion of the silicic acid suspension from a zone of highest turbulence of the suspension in the container; and
(e) means for maintaining level of filling of the container so that the ratio of container diameter to level of filling is a maximum of about 1:2.

The ratio of container diameter to the diameter of the stirring means is about 3:1.

This invention will be more fully described hereinafter with reference to the drawing wherein:

FIG. 1 is a diagram of typical apparatus employed in this invention.

The silicic acid filter cake employed in the process of this invention can be prepared by well known means. For example, as described in U.S. Pat. No. 3,467,019 and German patent application DAS No. 1,049,834. Typically, the silicic acid filter cake from these known processes will contain about 20% by weight solids, but it will be understood that filter cakes having other solids contents can be employed in the process of the present invention.

A single screw or a double screw can be employed as the feeding element for the silicic acid filter cake. In the preferred embodiment of this invention, the suspension agent and silicic acid filter cake are simultaneously fed to the dissolver container via the feeding element.

The suspension agent (dispersing agent) is usually an organic or inorganic acid. The suspension agent and the amount thereof will be selected so as to be capable of maintaining the pH value of at most about 4 in the silicic acid suspension; thus, the use of weak acids will be avoided. Typically, the suspension agent is a dilute, aqueous mineral acid, such as sulfuric acid or hydrochloric acid. Preferably, the suspension agent is an aqueous solution containing about 20 to about 30 weight percent sulfuric acid.

In the preferred embodiment of this invention, the container is cylindrical and the ratio of dissolver container diameter to the diameter of the stirring element is about 2.5:1, in which case the ratio of the level of filling to container diameter will be about 1:1. A double disc agitator can be employed as the stirring element. A filter basket can be employed as the separating organ, or else the suspension can be drawn off via a series connected compulsory mixer or mixing pump. A portion of the silicic acid suspension passing through the filter basket or through the mixer can be returned to the container. As a result of the re-cycling shear on the silicic acid in the filter cake, there will be the desired freedom from nodules and grit.

The process of this invention is particularly advantageous because the silicic acid filter cake is re-structured so that the resulting silicic acid suspension is substantially homogeneous and substantially free of grit, and can be subjected to spray-drying without additional expenditures of power or labor.

As used herein, the expression "having little grit" means that the silicic acid product of this invention contains not more than about 0.2 weight percent of particles having a size greater than about 45 $\mu$m. After spray-drying, the resulting synthetic silica is useful e.g.

as a thickening agent in liquid compositions or as a reinforcing filler for rubber.

The process of this invention will be more fully understood by reference to the following Examples, wherein all parts, proportions, percentages and ratios are by weight, unless otherwise indicated.

EXAMPLE 1

260 kg/min of silicic acid filter cake having a water content of 82% are added by means of a double screw 1 at 295 rpm through a narrowed down outlet 2 in order to increase the kneading/mixing effect. Simultaneously, 0.6 l/min of dilute, aqueous, 30% sulphuric acid are fed through a duct 3 into a dissolver container 4 having a 1.5 m$^3$ capacity. At the same time, the concentration of acid in the container is maintained such that the resulting silicic acid suspension has a pH value of 3. The dissolver container 4 has a diameter of 1.2 m, a height of 1.5 m and is of cylindrical shape. A dissolver (stirring means) 5, which is a double disc agitator, has a diameter of the two discs 6 and 7 of 0.4 m, and is driven by an electric motor 8, which has an output of 36.7 kw (50 hp). The rpm of the two discs 6 and 7 is 21 m/sec (1000 rpm). The filling level 11 is kept between 0.8 m and 1.20 m by way of the immersion probes 9 and 10, so that there will be 1.5 kg of silicic acid suspension in the dissolver container 4. The resulting silicic acid suspension is filtered off from the zone of highest turbulence by means of a filter basket 12. A part of this silicic acid suspension is again recycled by way of a duct 13 and a pump 14, in order to lower the proportion of grit and nodules still farther.

It is surprising in the process of this invention that the liquid phase remains in existence and sprayable after a one-time shear, insofar as no critical concentration has been exceeded.

The silicic acid suspension obtained by way of this process has a viscosity of about 200 cp (20° C.) measured in the Viscotester of the firm Haake.

The silicic acid suspensions obtained by the process of this invention are sprayable even if the solids content of the suspension is 25 weight percent and more.

What is claimed is:

1. An apparatus for the production of a sprayable, highly concentrated suspension of a precipitated silicic acid having little grit and at least about 12 percent by weight solids, said apparatus comprising:
    (a) a container having a diameter, said container provided with rotatable stirring means having a diameter and a peripheral speed of about 20–30 m/sec;
    (b) means for feeding a silicic acid filter cake to said container;
    (c) means for feeding a suspension agent to said container;
    (d) means for removing a portion of said silicic acid suspension from a zone of highest turbulence of the suspension in said container; said means including a filter basket, and
    (e) means for maintaining level of filling of said container so that the ratio of container diameter to level of filling is a maximum of about 1:2;
    wherein the ratio of container diameter to the diameter of said stirring means is about 3:1.

2. An apparatus for the production of sprayable, highly concentrated suspension of a precipitated silicic acid having little grit and at least about 12 percent by weight solids, said apparatus comprising:
    (a) a container having a diameter, said container provided with rotatable stirring means having a diameter and a peripheral speed of about 20–30 m/sec;
    (b) means for feeding a silicic acid filter cake to said container;
    (c) means for feeding a suspension agent to said container;
    (d) means for removing a portion of said silicic acid suspension from a zone of highest turbulence of the suspension in said container; said means including a mixing pump, and;
    (e) means for maintaining level of filling of said container so that the ratio of container diameter to level of filling is a maximum of about 1:2; wherein the ratio of container diameter to the diameter of said stirring means is about 3:1.

3. Apparatus as claimed in claim 1 or 2 including means for returning a portion of said suspension that is removed from said container back to said container.

* * * * *